United States Patent
Kato et al.

(10) Patent No.: US 11,524,688 B2
(45) Date of Patent: Dec. 13, 2022

(54) APPARATUS AND METHOD FOR ASSISTING TURN OF VEHICLE AT INTERSECTION

(71) Applicant: DENSO CORPORATION, Kariya (JP)

(72) Inventors: Kenji Kato, Kariya (JP); Yohei Masui, Kariya (JP); Mitsuhiro Tokimasa, Kariya (JP); Yuta Komoguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 150 days.

(21) Appl. No.: 16/458,793

(22) Filed: Jul. 1, 2019

(65) Prior Publication Data
US 2020/0001875 A1    Jan. 2, 2020

(30) Foreign Application Priority Data

Jul. 2, 2018   (JP) .............................. JP2018-126000

(51) Int. Cl.
*B60W 30/18*     (2012.01)
*B60W 50/14*     (2020.01)
(Continued)

(52) U.S. Cl.
CPC ...... *B60W 30/18154* (2013.01); *B60W 50/14* (2013.01); *G01C 21/3602* (2013.01);
(Continued)

(58) Field of Classification Search
CPC ..... B60W 30/18009; B60W 30/18154; B60W 2540/20; B60W 50/08; B60W 50/10;
(Continued)

(56) References Cited

U.S. PATENT DOCUMENTS 6,321,160 B1 * 11/2001 Takahashi ............ G09B 29/106
                                                                   701/410
6,353,788 B1 * 3/2002 Baker ................. B60K 31/0008
                                                                    340/436
(Continued)

FOREIGN PATENT DOCUMENTS

DE            769678 A1 * 10/1996 ............. G01C 21/20
DE    102016222502 A1 * 5/2017 ............. G08G 1/167
(Continued)

OTHER PUBLICATIONS

Modeling and prediction of driver preparations for making a right turn based on vehicle velocity and traffic conditions while approaching an intersection;T Sato, M Akamatsu—Transportation Research Part F: Traffic Psychology and Behaviour;vol. 11, Issue 4, Jul. 2008, pp. 242-258, (year: 2008).*

(Continued)

*Primary Examiner* — Cuong H Nguyen
(74) *Attorney, Agent, or Firm* — Maschoff Brennan

(57) ABSTRACT

In an apparatus for assisting a turn of a vehicle at an intersection, a turn-signal state detection unit is configured to detect an operating state of a turn signal of the vehicle. A road information detection unit is configured to detect road information that is information regarding a road on which the vehicle is traveling. A determination unit is configured to, using at least one of the detected operating state of the turn signal and the detected road information, determine whether or not the vehicle will make a turn at the intersection.

6 Claims, 10 Drawing Sheets

(51) Int. Cl.
   *G01C 21/36* (2006.01)
   *B62D 6/00* (2006.01)
   *G05B 23/02* (2006.01)

(52) U.S. Cl.
   CPC ..... *B60W 2540/20* (2013.01); *B60W 2556/50* (2020.02); *B60Y 2200/11* (2013.01)

(58) Field of Classification Search
   CPC .............. B60W 50/14; G01C 21/3602; G01C 21/3608; B60Y 2200/11
   USPC .................. 340/435, 303; 342/70; 701/1
   See application file for complete search history.

(56) References Cited

U.S. PATENT DOCUMENTS

| | | | |
|---|---|---|---|
| 6,842,693 B2* | 1/2005 | Nagamune | G01C 21/26 340/995.12 |
| 6,856,896 B2* | 2/2005 | Kushida | G01S 19/14 701/538 |
| 7,483,785 B2* | 1/2009 | Suzuki | G01C 21/36 340/995.2 |
| 8,126,644 B2* | 2/2012 | Amano | G08G 1/096741 701/437 |
| 8,290,665 B2* | 10/2012 | Placke | G06K 31/0008 340/436 |
| 8,660,734 B2* | 2/2014 | Zhu | G07X 9/00563 701/23 |
| 8,892,356 B1* | 11/2014 | Weiland | G06F 16/29 701/431 |
| 8,983,679 B2* | 3/2015 | Kitahama | G01C 21/34 701/28 |
| 9,008,958 B2* | 4/2015 | Rubin | G08G 1/16 701/301 |
| 2007/0041552 A1* | 2/2007 | Moscato | H04M 1/172454 379/214.01 |
| 2008/0065293 A1* | 3/2008 | Placke | B62D 15/029 348/148 |
| 2009/0051516 A1* | 2/2009 | Abel | B62D 15/025 701/41 |
| 2009/0109037 A1* | 4/2009 | Farmer | G06Q 30/0631 705/40 |
| 2010/0191449 A1* | 7/2010 | Iwamoto | G08G 1/08 701/118 |
| 2012/0022716 A1* | 1/2012 | Kitahama | G08G 1/166 701/1 |
| 2012/0083960 A1* | 4/2012 | Zhu | G06Q 10/02 701/23 |
| 2012/0166072 A1* | 6/2012 | Tamaoki | B60W 30/18154 701/300 |
| 2012/0306368 A1* | 12/2012 | Tatara | B60Q 1/18 315/81 |
| 2014/0244096 A1* | 8/2014 | An | B60W 50/08 701/25 |
| 2014/0249722 A1* | 9/2014 | Hegemann | G08G 1/166 701/1 |
| 2017/0050642 A1* | 2/2017 | Heckmann et al. | B60W 50/08 |
| 2020/0001875 A1* | 1/2020 | Kato | B06W 30/18154 |

FOREIGN PATENT DOCUMENTS

| | | | | |
|---|---|---|---|---|
| JP | H0920261 A | * | 9/1997 | ............... B62D 6/00 |
| JP | 2004218562 A | * | 8/2004 | .......... F02N 11/0837 |
| JP | 3755100 B2 | * | 3/2006 | ............. G01C 21/00 |
| JP | 2006-78684 A | | 7/2006 | |
| JP | 3831881 B2 | * | 10/2006 | ............ B60W 30/00 |
| JP | 2008-015670 A | | 1/2008 | |
| JP | 4329088 B2 | * | 9/2009 | ............. G01C 21/00 |
| JP | 2011-143745 A | | 7/2011 | |
| JP | 2011143745 A | * | 7/2011 | ............ B60W 30/00 |
| JP | 2017-134501 A | | 8/2017 | |
| JP | 2020004333 A | * | 1/2020 | ...... B60W 30/18154 |

OTHER PUBLICATIONS

Auditory perception of motor vehicle travel paths; DH Ashmead, DW Grantham, ES Maloff . . .—Human . . . , 2012—journals. sagepub.com.*

A protocol for mixed autonomous and human-operated vehicles at intersections; G Sharon, P Stone—International Conference on Autonomous Agents and Multiagent Systems—Conference proceedings—AAMAS 2017 (Year: 2017).*

Automated intersection delay estimation using the input-output principle and turning movement data; I Shatnawi, P Yi, I Khliefat—International Journal of Transportation Science and Technology; vol. 7, Issue 2, Jun. 2018, pp. 137-150 (Year: 2018).*

Xin-An Fan et al., A Brain-Computer Interface-based Vehicle Destination Selectrion System Using P300 and SSVEP Signals, IEEE Trans. on Intlligent Transportation Systems, vol. 16, No. 1, Feb. 2015 (Year: 2015).*

David Fajardo et al., an abstract of "Automated Intersection Control: Performance of Future Innovation Versus Current Traffic Signal Control"; from https://doi.org/10.3141/2259-21; (Year: 2011).*

Tomás E. Lindheimer et al.; an abstract of "Evaluation of Confirmation Lights on Red Light Running Violations by Time-into-Red Phase"; from https://doi.org/10.3141/2584-04 (Year: 2016).*

Harold W. Faw, To signal or not to signal: That should not be the question; Accident Analysis and Prevention 59 (2013) 374-381 (Year: 2013).*

Katri Salminen et al., Unimodal and Multimodal Signals to Support Control Transitions in Semiautonomous Vehicles, AutomotiveUI '19, Sep. 21-25, 2019, Utrecht, Netherlands (Year: 2019).*

L. Chen and C. Englund, "Cooperative Intersection Management: A Survey,"in IEEE Transactions on Intelligent Transportation Systems, vol. 17, No. 2, pp. 570-586, Feb. 2016, doi: 10.1109/TITS. 2015.2471812. (Year: 2016).*

M. Maile, Q. Chen, G. Brown and L. Delgrossi, "Intersection Collision Avoidance: From Driver Alerts to Vehicle Control," 2015 IEEE 81st Vehicular Technology Conference (VTC Spring), 2015, pp. 1-5, doi: 10.1109/VTCSpring.2015.7145888. (Year: 2015).*

T. Streubel and K. H. Hoffmann, "Prediction of driver intended path at intersections," 2014 IEEE Intelligent Vehicles Symposium Proceedings, 2014, pp. 134-139, doi: 10.1109/IVS.2014.6856508. (Year: 2014).*

* cited by examiner

APPARATUS AND METHOD FOR ASSISTING TURN OF VEHICLE AT INTERSECTION

CROSS-REFERENCE TO RELATED APPLICATION

This application is based on and claims the benefit of priority from earlier Japanese Patent Application No. 2018-126000 filed on Jul. 2, 2018, the description of which is incorporated herein by reference.

BACKGROUND

Technical Field

This disclosure relates to a technique for assisting a turn of a vehicle at an intersection.

Related Art

Conventionally, a vehicle control apparatus is known that assists making a turn of a vehicle at an intersection. A known technique notifies an occupant, such as a driver, of the vehicle of information for assisting making a turn of the vehicle when an assistance start condition is met.

DESCRIPTION OF SPECIFIC EMBODIMENTS

Figure 1:
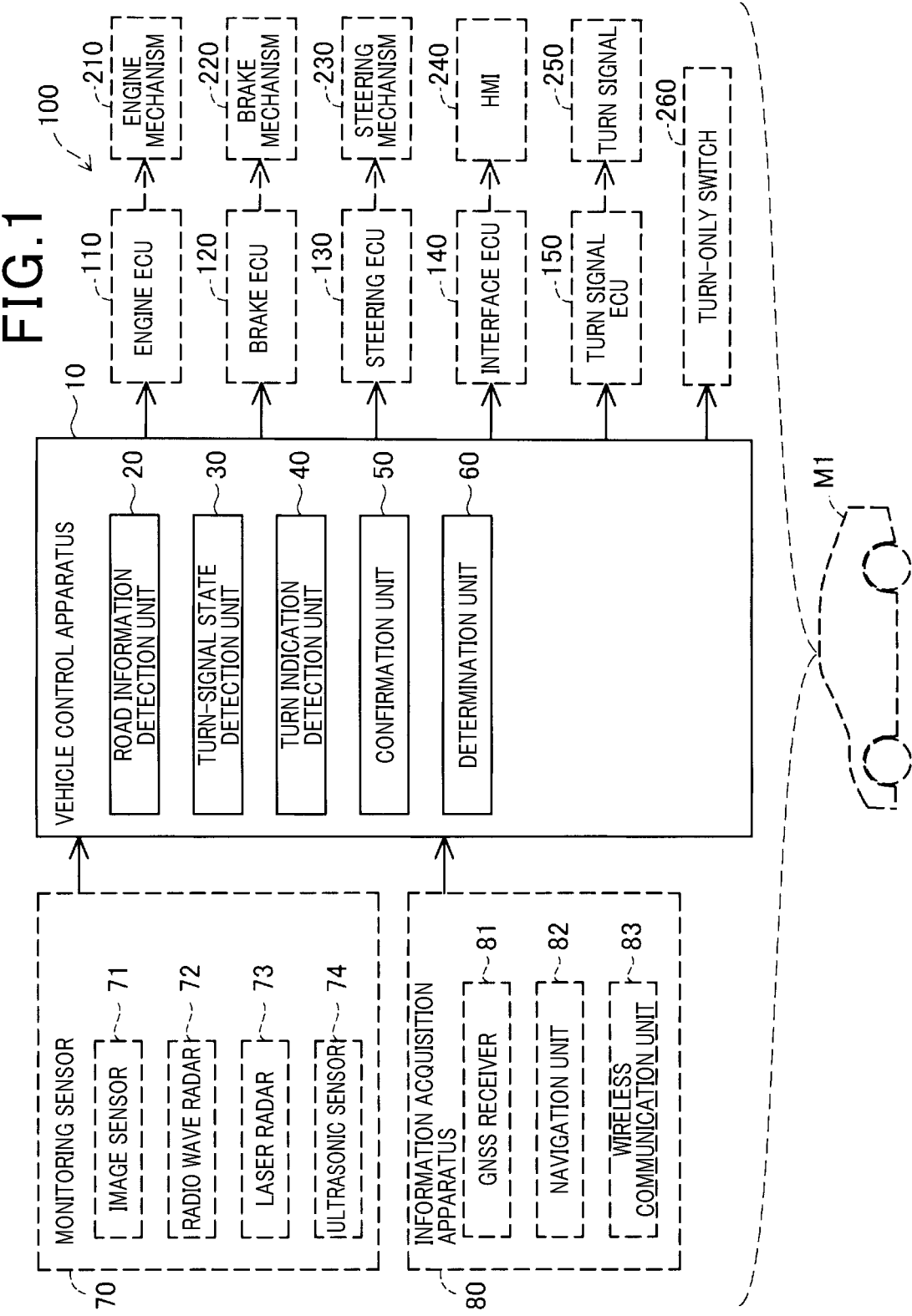
FIG. 1 is a block diagram of a vehicle control apparatus.

In the known technique, as disclosed in JP-A-2012-141655, the assistance start condition is a condition that the turn signal is on. This can give rise to an issue that unnecessary turn assistance control may be started when the turn signal is turned on for purposes other than making a turn at an intersection, such as making a lane change. However, a determination can not be readily made as to whether the turn signal is turned on for making a turn at an intersection or for another purpose.

In view of the above, it is desired to have a technique that can inhibit determination accuracy lowering as to as to whether or not a turn will be made at an intersection.

Hereinafter, exemplary embodiments of the present disclosure will be described in detail with reference to the accompanying drawings, in which like reference numerals refer to like or similar elements regardless of reference numerals and duplicated description thereof will be omitted.

A. First Embodiment

A-1. Overall Configuration

Referring to FIG. 1, a vehicle control apparatus 10 according to a first embodiment of this disclosure is mounted in a vehicle M1 and controls travel of the vehicle M1 during passing through an intersection. Without limitation to such a situation where the vehicle M1 is passing through an intersection, the vehicle control apparatus 10 may control the vehicle M1 in any traveling situations. In the present embodiment, the vehicle M1 is also referred to as an own vehicle M1. The own vehicle M1 is a vehicle with an engine. The own vehicle M1 is also a vehicle capable of automatic driving and switching between automatic driving and manual driving. The term "automatic driving" refers to driving such that engine control, brake control, and steering control are automatically performed without being manually performed by an occupant of the own vehicle. The term "manual driving" refers to driving such that operations for engine control, such as depression of an accelerator pedal, operations for brake control, such as depression of a brake pedal, and operations for steering control, such as rotation of a steering wheel, are performed by the occupant of the own vehicle M1. In the following, an example scenario will now be described, where automatic driving of the own vehicle M1 is performed in compliance with left-hand traffic regulations.

The vehicle control apparatus 10 of the present embodiment may be configured as an electronic control unit (ECU) including a microcomputer and a memory. The vehicle control apparatus 10 is connected to a monitoring sensor 70, information acquisition apparatus 80, an operation control apparatus 100, and a turn-only switch 260 via an onboard network, such as a controller area network (CAN).

The monitoring sensor 70 includes sensors that detect objects around the own vehicle M1. The objects around the own vehicle M1 include objects in the frontal or lateral or backward direction of the own vehicle M1. The monitoring sensor 70 includes an image sensor 71, a radio wave radar 72, a laser radar 73, an ultrasonic sensor 74. The image sensor 71 includes an imaging camera that captures at least an image looking in a forward direction of the own vehicle M1. In the present embodiment, the imaging camera is a stereo camera. In one alternative embodiment, the imaging camera may be monocular camera. The radio wave radar 72 emits radio waves and detect reflected waves of the emitted waves to thereby detect the presence or absence of an object around the own vehicle M1, a distance between the detected object and the own vehicle M1, a position, a size, and a shape of the detected object, and a speed of the detected object relative to the own vehicle M1. The laser radar 73 uses infrared light to detect the presence or absence of an object around the own vehicle M1, as with the radio radar 72. The ultrasonic sensor 74 uses ultrasonic waves to detect a distance between an object around the own vehicle M1 and the own vehicle M1, as with the radio radar 72.

The information acquisition apparatus 80 is configured to acquire various assistance information for automatic driving. The information acquisition apparatus 80 includes a GNSS receiver 81, a navigation unit 82, a wireless communication unit 83, the GNSS receiver 81 is configured to, based on navigation signals received from satellites forming the global navigation satellite system (GNSS), detect a current location (longitude, latitude) of the own vehicle M1. The navigation unit 82 is configured to, based on destination information preset by the occupant of the own vehicle M1 and the current location of the own vehicle M1 detected by the GNSS receiver 81, determine a route to be taken for automatic driving. An additional sensor, such as a gyro sensor, as well as the GNSS receiver 81, may be used to determine or modify the route. The navigation unit 82 includes a dynamic map. The dynamic map includes dynamic information, such traffic jam information, as well as static map information, such as information about road widths and lanes. The wireless communication unit 83 performs wireless communications with an intelligent transport system (ITS), vehicle-to-vehicle communications with other vehicles, and vehicle-to-infrastructure communications with roadside wireless units installed in roadside equipment. This enables exchanging status information concerning a status of the own vehicle M1 and an environment surrounding the own vehicle M1.

The operation control apparatus 100 is configured to control operations of the own vehicle M1. In the present embodiment, the operation control apparatus 100 includes an engine ECU 110, a brake ECU 120, a steering ECU 130, an interface ECU 140, and a turn signal ECU 150.

The engine ECU 110 is configured to control operations of the engine 210. More specifically, the engine ECU 110 is configured to control opening and closing of a throttle valve, ignition of an igniter, opening and closing of an intake valve, by controlling various actuators (not shown). The brake ECU 120 controls a brake mechanism 220. The brake mechanism 220 is formed of actuators involved in brake control, such as sensors, motors, valves, and pumps. The brake ECU 120 is configured to determine the brake timing and an amount of braking, and control the various actuators forming the brake mechanism 220 such that the determined amount of braking can be achieved at the determined timing. The steering ECU 130 controls a steering mechanism 230. The steering mechanism 230 is formed of actuators involved in steering, such as a power steering motor. The steering ECU 130 is configured to determine an amount of steering (i.e., a steering angle) based on measurements acquired from a yaw rate sensor or a steering angle sensor (not shown), and control various actuators forming the steering mechanism 230 such that the determined amount of steering can be achieved.

The interface ECU 140 controls a human-machine interface 240 (hereinafter referred to as HMI 240). The HMI 240 includes a display unit that displays characters and image, a speaker that outputs voice or warning sound, and a microphone that acquires a voice of the occupant of the own vehicle M1, and selection buttons located on a steering wheel. The HMI 240 functions to notify the occupant of the own vehicle M1 of various information in the form of visual information or auditory information and receive information from the occupant.

The turn signal ECU 150 controls operations of the turn signal 250. That is, the turn signal ECU 150 controls turning on and off of the turn signal 250. The turn signal ECU 150 notifies the turn-signal state detection unit 30 of the vehicle control apparatus 10 of an operating state of the turn signal 250, that is, a lit state or an unlit state of the turn signal 250. The turn signal 250 is switched by the occupant's operation between the lit state and the unlit state. Commonly, the turn signal 250 is placed in the lit state when the own vehicle M1 makes a lane change or when the own vehicle M1 makes a left or right turn. The turn signal 250 includes a left and a right turn signal.

The turn-only switch 260 is operated by the occupant to indicate a left or right turn of the own vehicle M1. The turn-only switch 260 may be located on the steering wheel. The turn-only switch 260 includes two switches: one dedicated to a left turn and the other dedicated to a right turn. A notification of a result of operation of the turn-only switch 260 is provided to the turn indication detection unit 40 of the vehicle control apparatus 10.

The vehicle control apparatus 10 includes a road information detection unit 20, a turn-signal state detection unit 30, a turn indication detection unit 40, a confirmation unit 50, and a determination unit 60. Functions of these components 20-60 may be implemented by the microcomputer of the vehicle control apparatus 10 executing control programs pre-stored in a storage (not shown) of the vehicle control apparatus 10.

The road information detection unit 20 detects road information that is information regarding a road on which the own vehicle M1 is traveling, based on a result of detection by the monitoring sensor 70 and information acquired by the information acquisition apparatus 80. The road information includes lane-of-travel information that is information about a lane in which the own vehicle M1 is traveling (hereinafter also referred to as a lane of travel), information about an intersection that the own vehicle M1 is to pass through, information about a distance from the own vehicle M1 to such an intersection, information about a road structure, information about a route to be taken based on destination information, information about objects around the own vehicle M1, and other information. The lane-of-travel information includes the number of lanes in the same direction of traffic, the presence or absence of a lane adjacent to the lane of travel of the own vehicle M1, designated traffic of the lane of travel, such as a right turn-only-lane, a left-turn-only lane, or a through-only lane. The information about the intersection includes designated traffic of the intersection, such as a no-right-turn intersection or a no-left-turn intersection. The information about the distance from the own vehicle M1 to the intersection indicates whether or not the distance from the own vehicle M1 to the intersection is equal to or less than a predetermined value. For example, when the color of lane lines that demarcate each lane is yellow within a distance to the intersection equal to or less than the predetermined value, the information about the distance from the own vehicle M1 to the intersection may be detected based on the color of the lane lines corresponding to the current location of the own vehicle M1. The road information detection unit 20 makes determinations about the road information in the vehicle control processing described later.

Upon receipt of the notification of the operating state of the turn signal 250 from the turn signal ECU 150, the turn-signal state detection unit 30 detects an operating state of the turn signal 250. The turn indication detection unit 40 detects the presence or absence of a turn indication resulting from the turn-only switch 260 being operated.

The confirmation unit 50 confirms to the occupant of the own vehicle M1 as to whether or not the own vehicle M1 is going to make a turn at an intersection. Such confirmation, as described later, is made in response to the operating state of the turn signal 250 and the road information. In the present embodiment, the confirmation unit 50 controls the interface ECU 140 to generate a voice output from a speaker of the HMI 240, thereby making the confirmation. For example, the confirmation may be made by generating a voice output, "Are you going to make a right turn at the intersection?" The occupant may reply thereto by selecting and pushing down one of two buttons: YES and NO buttons.

The determination unit 60 determines whether or not the own vehicle M1 is going to make a turn at the intersection. Such a determination may be made using at least one of the operating state of the turn signal 250, the road information, and a result of confirmation by the confirmation unit 50. More specifically, if determining from the operating state of the turn signal 250 and the road information that the own vehicle M1 is likely to make a left or right turn at the intersection, the determination unit 60 skips confirmation to be made by the confirmation unit 50 and determines that the own vehicle M1 is going to make a left or right turn at the intersection. If the YES button is pushed down by the occupant in reply to the voice output, "Are you going to make a right turn at the intersection?", the determination unit 60 determines that the own vehicle M1 is going to make a right turn at the intersection. If the NO button is pushed down by the occupant in reply to the voice output, "Are you going to make a right turn at the intersection?", the determination unit 60 determines that the own vehicle M1 is not going to make a right turn at the intersection.

If the determination unit 60 determines that the own vehicle M1 is going to make a turn at the intersection, the operation control apparatus 100 performs turn assistance control of the own vehicle M1 at the intersection. If the determination unit 60 determines that the own vehicle M1 is not going to make a turn at the intersection, the operation control apparatus 100 does not perform turn assistance control of the own vehicle M1 at the intersection. The turn assistance at the intersection is performed by controlling operations of the steering mechanism 230, the braking mechanism 220, and the engine 210 in response to a travel trajectory determined based on size and shape of the intersection. The turn assistance at an intersection may be driving assistance including braking assistance and steering assistance performed to avoid or inhibit a collision with an oncoming vehicle traveling in an oncoming lane and a collision with a pedestrian or a bicycle after completion of the left or right turn.

A-2. Vehicle Control Processing

Figure 2:
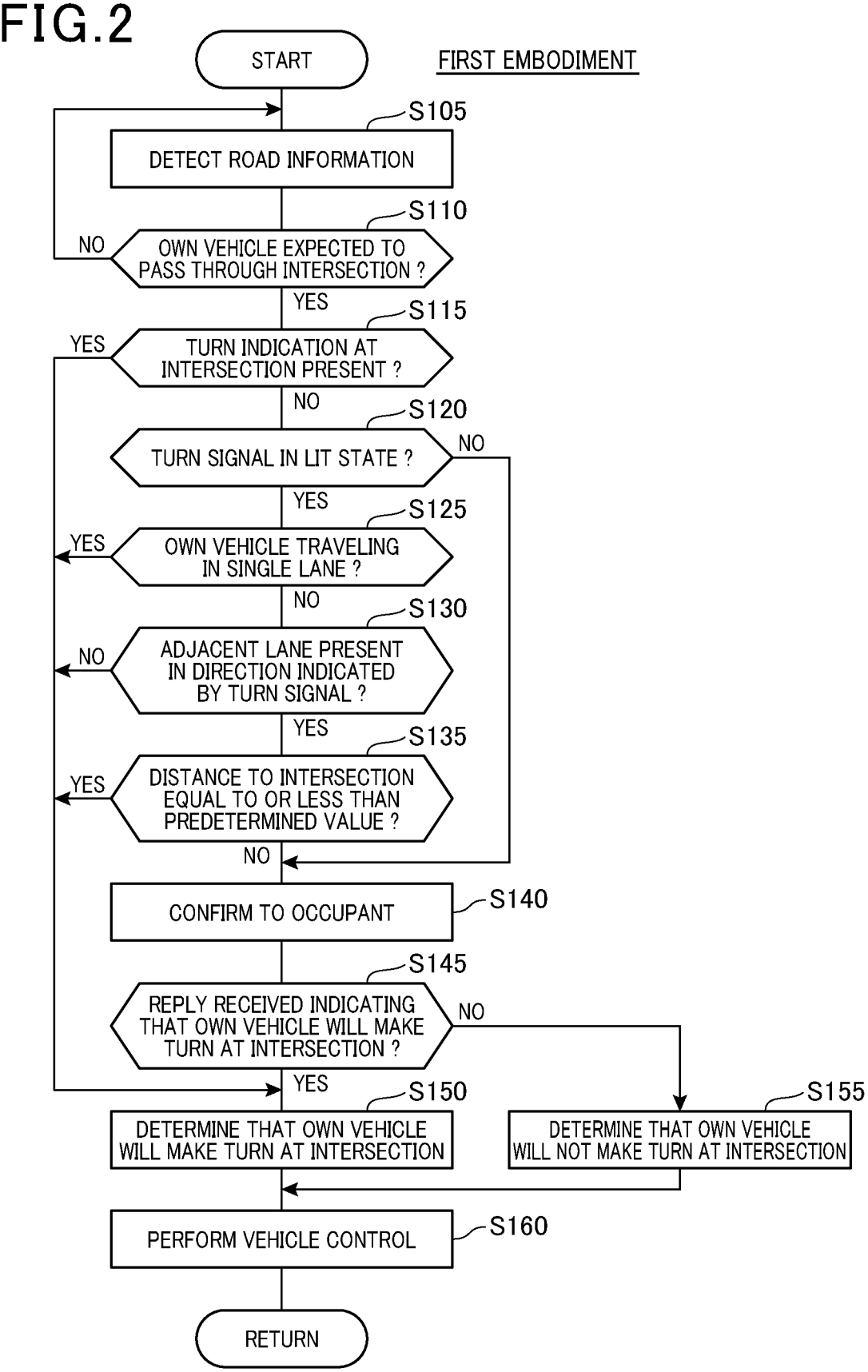
FIG. 2 is a flowchart of vehicle control processing according to a first embodiment.

Vehicle control processing shown in FIG. 2 is performed by the vehicle control apparatus 10 of the own vehicle M1 during a time period from ON to OFF of a start switch. In the following, compliance with left-hand traffic regulations is assumed.

At step S105, the road information detection unit 20 detects information regarding a road on which the own vehicle M1 is traveling. At step S110, the road information detection unit 20 detects whether or not the own vehicle M1 is expected to pass through an intersection. The phase "pass through an intersection" includes passing straight through an intersection and making a turn at an intersection. The phase "expected to pass through an intersection" means that there is an intersection ahead of the own vehicle M1 along its travel path. For example, whether or not there is an intersection ahead of the own vehicle M1 along its travel path may be determined based on a result of detection by the GNSS receiver 81 and the map information of the navigation unit 82, or may be determined based on a result of detection by the monitoring sensor 70. If it is determined that the own vehicle M1 is not expected to pass through an intersection (the "NO" branch of step S110), the process flow returns to step S105. If it is determined that the own vehicle M1 is expected to pass through an intersection (the "YES" branch of step S110), then at step S115 the turn indication detection unit 40 determines whether or not there is a turn indication at the intersection from the own vehicle M1. The turn indication is provided by an occupant of the own vehicle M1 operating the turn-only switch 260. If at step S115 the turn indication detection unit 40 determines that there is a turn indication at the intersection from the own vehicle M1, then at step S150 the determination unit 60 determines that the own vehicle M1 will make a turn at the intersection. At step S160, the operation control apparatus 100 performs, as vehicle control, turn assistance control of the own vehicle M1 at the intersection. Thereafter, the process flow returns to step S105.

If the turn indication detection unit 40 determines that there is no turn indication at the intersection (the "NO" branch of step S115), then at step S120 the turn-signal state detection unit 30 determines whether or not the turn signal 250 is in the lit state. If the turn-signal state detection unit 30 determines that the turn signal 250 is not in the lit state (the "NO" branch of step S120), then the confirmation unit 50 confirms to the occupant as to whether or not the own vehicle M1 will make a turn at the intersection.

Figure 3:
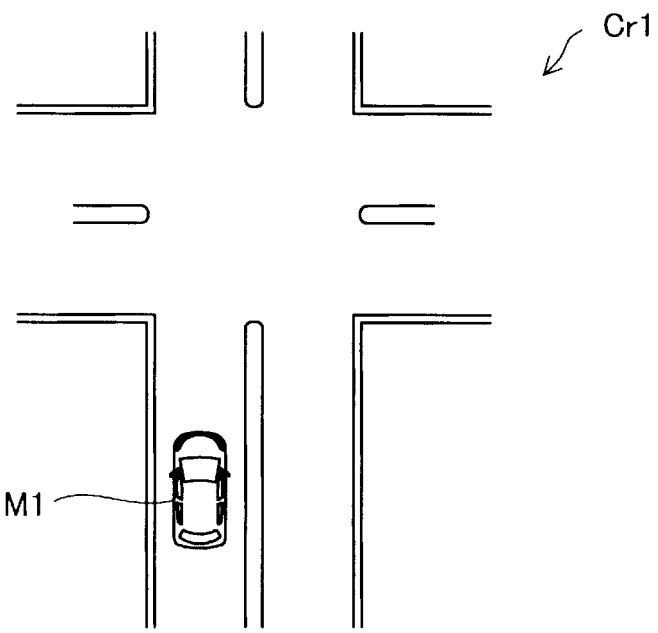
FIG. 3 is an example situation corresponding to the "NO" branch of step S120.

In the example shown in FIG. 3, the own vehicle M1 is expected to pass through an intersection Cr1, but the turn signal 250 is not in the lit state. In such a situation, two cases may be assumed. In one case, the own vehicle M1 may be expected to pass straight through the intersection Cr1. In the other case, despite the own vehicle M1 being expected to make a turn at the intersection Cr1, the occupant may have forgotten to operate the turn signal 250 or the turn-only switch 260. Thus, in the present embodiment, at step S140, whether or not the own vehicle M1 will make a turn at the intersection Cr1 is confirmed to the occupant. The process flow subsequent to step S140 will now be described later.

As shown in FIG. 2, if the turn-signal state detection unit 30 determines that the turn signal 250 is in the lit state (the "YES" branch of step S120), then at step S125 the road information detection unit 20 determines whether nor not the own vehicle M1 is traveling in a single lane. The single lane corresponds to a situation where the number of lanes in the same direction of traffic is one and there is no lane adjacent in the same direction of traffic to the lane in which the own vehicle M1 is traveling. If the road information detection unit 20 determines that the own vehicle M1 is traveling in a single lane (the "YES" branch of step S125), then at step S150 the determination unit 60 determines that the own vehicle M1 will make a turn at the intersection.

Figure 4:
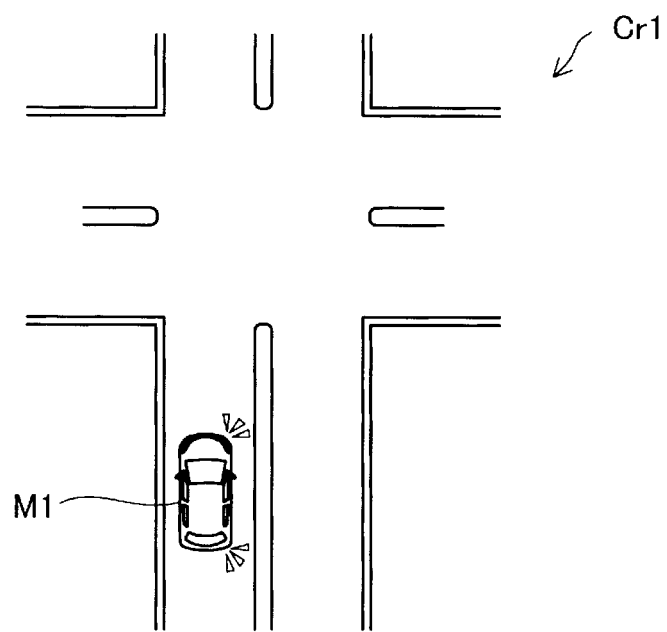
FIG. 4 is an example situation corresponding to the "YES" branch of step S125.

In the example shown in FIG. 4, the own vehicle M1 traveling in the single lane is expected to pass through the intersection Cr1 and the right turn signal 250 is in the lit state. In such a situation, the own vehicle M1 is likely to make a right turn at the intersection Cr1. Therefore, at step S150, the determination unit 60 determines that the own vehicle M1 will make a turn at the intersection. At step S160, the operation control apparatus 100 performs, as vehicle control, turn assistance control of the own vehicle M1 at the intersection Cr1. Thereafter, the process flow returns to step S105.

As shown in FIG. 2, if the road information detection unit 20 determines that the own vehicle M1 is not traveling in a single lane (the "NO" branch of step S125), that is, if it is determined that the number of lanes in the same direction of traffic is greater than one, then at step S130 the road information detection unit 20 determines whether or not there is a lane adjacent to the lane in which the own vehicle M1 is traveling, in the direction indicated by the turn signal 250 in the lit state. If the road information detection unit 20 determines that there is no lane adjacent to the lane in which the own vehicle M1 is traveling, in the direction indicated by the turn signal 250 in the lit state (the "NO" branch of step S130), then at step S150 the determination unit 60 determines that the own vehicle M1 will make a turn at the intersection.

Figure 5:
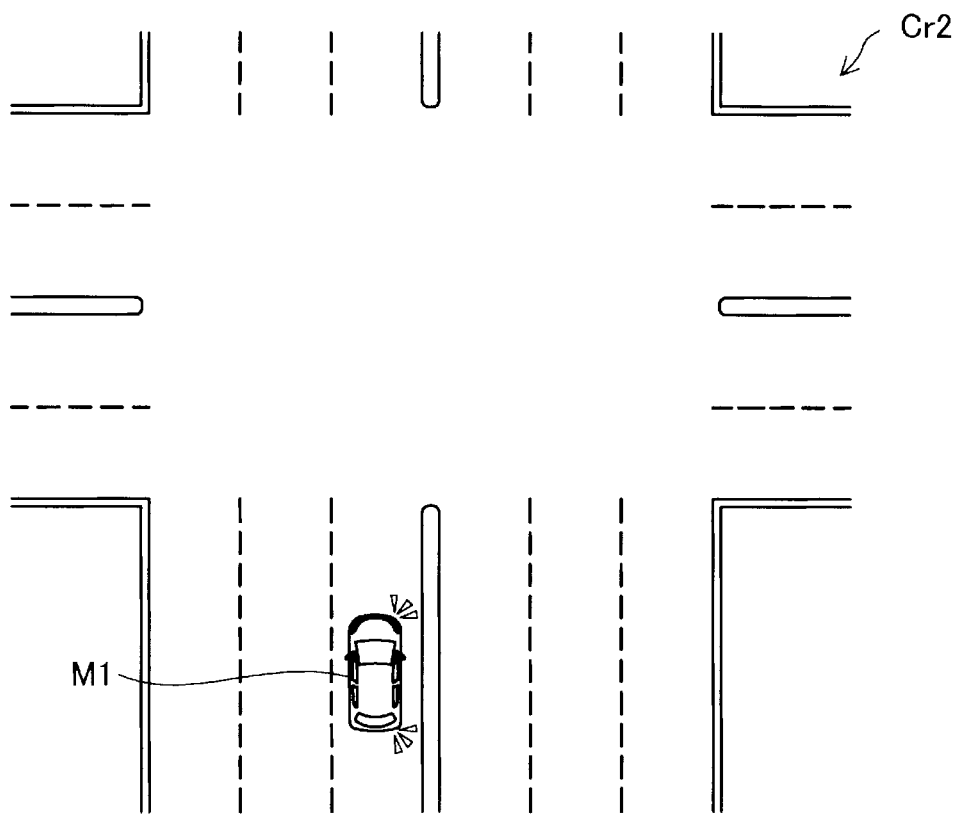
FIG. 5 is an example situation corresponding to the "NO" branch of step S130.

In the example shown in FIG. 5, the own vehicle M1 traveling in the rightmost lane of three lanes is expected to pass through an intersection Cr2 and the right turn signal 250 is in the lit state. In such a situation, the own vehicle M1 is likely to make a right turn at the intersection Cr2. Therefore, at step S150, the determination unit 60 determines that the own vehicle M1 will make a turn at the intersection Cr2. At step S160, the operation control apparatus 100 performs, as vehicle control, turn assistance control of the own vehicle M1 at the intersection Cr2. Thereafter, the process flow returns to step S105.

As shown in FIG. 2, if the road information detection unit 20 determines that there is a lane adjacent to the lane in which the own vehicle M1 is traveling, in the direction indicated by the turn signal 250 in the lit state (the "YES" branch of step S130), then at step S135 the road information detection unit 20 determines whether or not the distance from the own vehicle M1 to the intersection is equal to or less than the predetermined value. If the road information detection unit 20 determines that the distance from the own vehicle M1 to the intersection is equal to or less than the predetermined value (the "YES" branch of step S135), the determination unit 60 determines that the own vehicle M1 will make a turn at the intersection.

Figure 6:
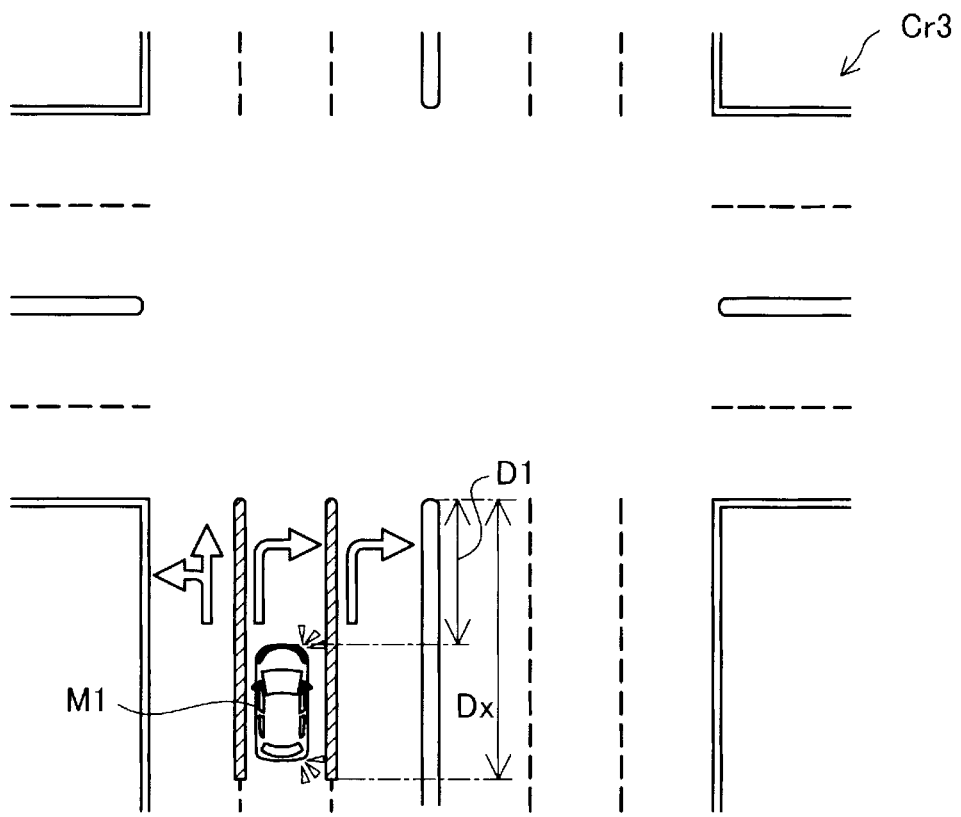
FIG. 6 is an example situation corresponding to the "YES" branch of step S135.

In the example shown in FIG. 6, the own vehicle M1 traveling in the center lane of three lanes is expected to pass through an intersection Cr3 and the right turn signal 250 is in the lit state. The center lane and the rightmost lane are right turn only lanes. The color of lane lines within a predefined distance Dx from the intersection Cr3 is a color that prohibits lane changes. In the present embodiment, the predefined distance Dx is set to 30 m. In addition, the distance from the own vehicle M1 to the intersection Cr3 is less than the predefined distance Dx. In such a situation, the own vehicle M1 is less likely to make a lane change to the right adjacent lane, and the own vehicle M1 is likely to make a right turn at the intersection Cr3 without making a lane change. Therefore, at step S150, the determination unit 60 determines that the own vehicle M1 will make a turn at the intersection Cr3. At step S160, the operation control apparatus 100 performs, as vehicle control, turn assistance control of the own vehicle M1 at the intersection Cr3. Thereafter, the process flow returns to step S105.

If, as shown in FIG. 2, the road information detection unit 20 determines that the distance from the own vehicle M1 to the intersection is greater than the predetermined value (the "NO" branch of step S135), at step S140 the confirmation unit 50 confirms to the occupant as to whether or not the own vehicle M1 will make a turn at the intersection.

In an example situation corresponding to the "NO" branch of step S135, unlike the situation shown in FIG. 6, the right turn signal 250 may be in the lit state at a distance from the intersection Cr3 greater than 30 m. In such a situation, two cases may be assumed. In one case, the own vehicle M1 may be expected to make a right turn at the intersection Cr3 without making a lane change. In the other case, the own vehicle M1 may make a lane change to the right adjacent lane. Therefore, at step S140, the confirmation unit 50 confirms to the occupant as to whether or not the own vehicle M1 will make a turn at the intersection Cr3.

As shown in FIG. 2, at step S145, the determination unit 60 determines whether or not a reply indicating that the own vehicle M1 will make a turn at the intersection Cr3 has been received from the occupant in response to confirmation by the confirmation unit 50. If the determination unit 60 determines that the reply indicating that the own vehicle M1 will make a turn at the intersection Cr3 has been received from the occupant (the "YES" branch of step S145), then at the step S150 the determination unit 60 determines that the own vehicle M1 will make a turn at the intersection Cr3. At step S160, the operation control apparatus 100 performs, as vehicle control, turn assistance control of the own vehicle M1 at the intersection Cr3. Thereafter, the process flow returns to step S105.

If the determination unit 60 determines that no reply indicating that the own vehicle M1 will make a turn at the intersection Cr3 has been received from the occupant (the "NO" branch of step S145), then at the step S155 the determination unit 60 determines that the own vehicle M1 will not make a turn at the intersection Cr3. At step S160, the operation control apparatus 100 performs, as vehicle control, lane change control of the own vehicle M1. Thereafter, the process flow returns to step S105.

In the present embodiment, a first condition predefined to determine that the own vehicle M1 may make a turn at the intersection includes a condition (a1) that the turn signal 250 is in the lit state, the own vehicle M1 is not traveling in a single lane, there is a lane adjacent to the lane in which the own vehicle M1 is traveling, in the direction indicated by the turn signal 250 in the lit state, and the distance from the own vehicle M1 to the intersection is greater than the predetermined value, or a condition (a2) that the turn signal 250 is in the unlit state. A second condition predefined to determine that the own vehicle M1 will make a turn at the intersection without confirming to the occupant of the own vehicle includes a condition (a3) that there is a turn indication generated by the turn-only switch 260 being operated, a condition (a4) that the own vehicle M1 is traveling in a single lane, a condition (a5) that there is no lane adjacent to the lane in which the own vehicle M1 is traveling, in the direction indicated by the turn signal 250 in the lit state, or a condition (a6) that the distance from the own vehicle M1 to the intersection is equal to or less than the predetermined value.

The vehicle control apparatus 10 of the first embodiment as describe above is configured to, in response to the operating state of the turn signal 250 and the road information, confirms to an occupant of the own vehicle M1 as to whether or not the own vehicle M1 will make a turn at an intersection, and using at least one of a result of confirmation from the occupant and a combination of the operating state of the turn signal 250 and the road information, determines whether or not the own vehicle M1 will make a turn at the intersection. This configuration can inhibit the determination accuracy lowering as to whether or not the own vehicle M1 will make a turn at the intersection. Therefore, in the case where the turn signal 250 is operated with intent to make a lane change or the like, unnecessary turn assistance can be inhibited from being performed. In addition, a situation can be avoided where the vehicle control apparatus 10 fails to determine whether or not the own vehicle M1 will make a turn at the intersection and thus withholds turn assistance.

The road information includes lane-of-travel information about a lane of travel of the own vehicle M1. This enables properly determining whether to confirm to the occupant of the own vehicle based on the presence or absence of a lane adjacent to the lane of travel of the own vehicle M1 or designated traffic of the lane of travel.

According to the flowchart shown in FIG. 2, if the own vehicle M1 may make a turn at the intersection, the confirmation unit 50 confirms to the occupant of the own vehicle M1 as to whether or not the own vehicle M1 will make a turn at the intersection. That is, if the operating state of the turn signal 250 and the road information satisfy a predefined first condition to determine that the own vehicle M1 may make a turn at the intersection, the confirmation unit 50 confirms to the occupant of the own vehicle M1 as to whether or not the own vehicle M1 will make a turn at the intersection. This enables confirming to the occupant of the own vehicle in a situation where it is difficult to determine whether the own vehicle M1 will make a turn at the intersection, and thus enables differentiating between the turn signal 250 being operated to make a turn at the intersection or the turn signal 250 being operated for purposes other than making a turn at the intersection. In addition, a situation can be avoided where operating the turn signal 250 may remain forgotten despite the own vehicle M1 being expected to make a turn at the intersection.

The vehicle control apparatus 10 is configured to, if at least a condition is met that the turn signal 250 is in the lit state and there is a lane adjacent to the lane in which the own vehicle M1 is traveling, in the direction indicated by the turn signal 250 in the lit state, confirm to the occupant of the own vehicle M1. This enables differentiating between the turn signal 250 being operated to make a turn at the intersection or the turn signal 250 being operated to make a lane change.

According to the flowchart shown in FIG. 2, if the own vehicle M1 is likely to make a turn at the intersection, the confirmation unit 50 does not confirm to the occupant of the own vehicle M1 as to whether or not the own vehicle M1 will make a turn at the intersection. That is, if the operating state of the turn signal 250 and the road information satisfy a predefined second condition to determine that the own vehicle M1 will make a turn at the intersection, the vehicle control apparatus 10 determines that the own vehicle M1 will make a turn at the intersection without confirming to the occupant of the own vehicle. This can inhibit an unnecessary confirmation from being performed, thus enabling inhibiting the occupant from feeling discomfort due to the confirmation being performed frequently.

The vehicle control apparatus 10 is configured to, if the distance from the own vehicle M1 to the intersection is equal to or less than a predetermined value, determine that the own vehicle M1 will make a turn at the intersection without confirming to the occupant of the own vehicle M1, which enables properly determining a situation that the own vehicle M1 is likely to make a turn at the intersection.

B. Second Embodiment

Figure 7:
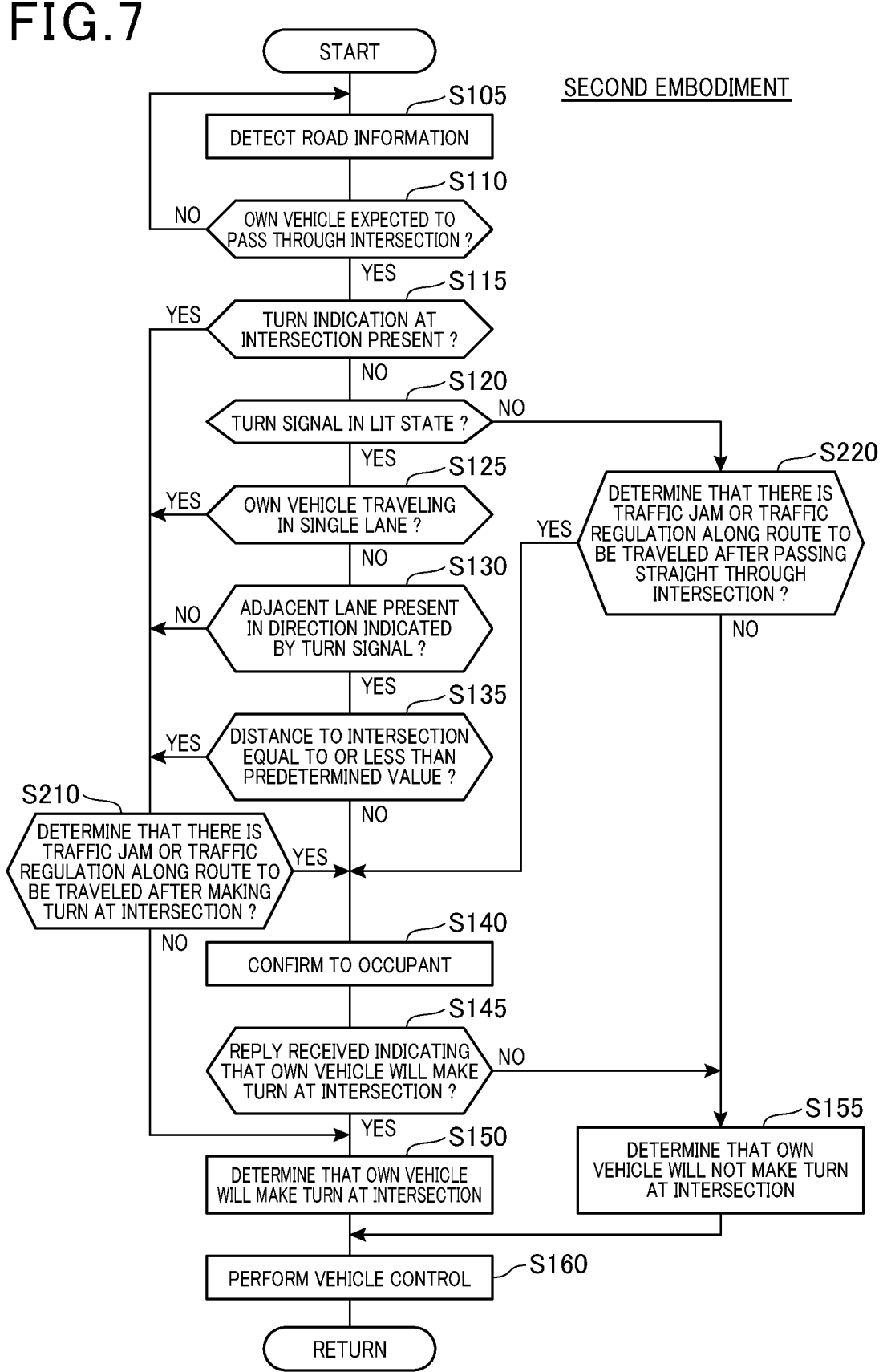
FIG. 7 is a flowchart of vehicle control processing according to a second embodiment.

In the vehicle control processing of a second embodiment shown in FIG. 7, if a driving plan may be changed due to the presence of a traffic jam, a traffic regulation or the like along a route that the own vehicle M1 will travel after passing through an intersection, the vehicle control apparatus 10 further confirms to the occupant of the own vehicle M1. The vehicle control processing of the second embodiment is different from the vehicle control processing of the first embodiment in that step S210 and step S220 along the "NO" branch of step S120 are included. The road information detection unit 20 of the vehicle control apparatus 10 according to the second embodiment is further configured to detect traffic jam information and traffic regulation information regarding a route that the own vehicle M1 will travel after making a turn at the intersection or after passing straight through the intersection. The other elements of the second embodiment having the same functions as in the first embodiment are numbered the same, and duplicate description will be omitted.

As shown in FIG. 7, if the turn indication detection unit 40 determines that there is a turn indication at the intersection from the own vehicle M1 (the "YES" branch of step S115), if the road information detection unit 20 determines that the own vehicle M1 is traveling in a single lane (the "YES" branch of step S125), if the road information detection unit 20 determines that there is no lane adjacent to the lane in which the own vehicle M1 is traveling, in the direction indicated by the turn signal 250 in the lit state (the "NO" branch of step S130), or if the road information detection unit 20 determines that the distance from the own vehicle M1 to the intersection is equal to or less than the predetermined value (the "YES" branch of step S135), the process flow proceeds to step S210. At step S210, the road information detection unit 20 determines whether or not there is a traffic jam or a traffic regulation along a route that the own vehicle M1 will travel after making a turn at the intersection. At step S210, for example, if the right turn signal 250 is in the lit state, the road information detection unit 20 determines whether or not there is a traffic jam or a traffic regulation along a route that the own vehicle M1 will travel after making a turn at the intersection. If the road information detection unit 20 determines that there is neither a traffic jam nor a traffic regulation along a route that the own vehicle M1 will travel after making a turn at the intersection (the "NO" of step S210), then at step S150 the determination unit 60 determines that the own vehicle M1 will make a turn at the intersection. If the road information detection unit 20 determines that there is a traffic jam or a traffic regulation along a route that the own vehicle M1 will travel after making a turn at the intersection (the "YES" of step S210), then at step S140 the confirmation unit 50 confirms to the occupant of the own vehicle M1 as to whether or not the own vehicle M1 will make a turn at the intersection. In cases where there is a traffic jam or a traffic regulation along a route that the own vehicle M1 will travel after making a turn at the intersection, the own vehicle M1 may withhold making a turn at the intersection to avoid the traffic jam, the traffic regulation or the like.

In addition, if the turn-signal state detection unit 30 determines that the turn signal 250 is not in the lit state (the "NO" branch of step S120), then at step S220 the road information detection unit 20 determines whether or not there is a traffic jam or a traffic regulation along a route that the own vehicle M1 will travel after passing straight through the intersection. If the road information detection unit 20 determines that there is neither a traffic jam nor a traffic regulation along a route that the own vehicle M1 will travel after passing straight through the intersection (the "NO" branch of step S220), then at step S155 the determination unit 60 determines that the own vehicle M1 will not make a turn at the intersection. If the road information detection unit 20 determines that there is a traffic jam or a traffic regulation along a route that the own vehicle M1 will travel after passing straight through the intersection (the "YES" branch of step S220), then at step S140 the confirmation unit 50 confirms to the occupant of the own vehicle M1 as to whether or not the own vehicle M1 will make a turn at the intersection. In cases where there is a traffic jam or a traffic regulation along a route that the own vehicle M1 will travel after passing straight through the intersection, the own vehicle M1 may withhold passing straight through the intersection and make a turn at the intersection to avoid the traffic jam or the like.

In the present embodiment, the first condition predefined to determine that the own vehicle M1 may make a turn at the intersection includes: any one of the conditions (a3) through (a6)+a condition (b1) that there is a traffic jam or a traffic regulation along a route that the own vehicle M1 will travel after making a turn at the intersection; or the condition (a2)+a condition (b2) that there is a traffic jam or a traffic regulation along a route that the own vehicle M1 will travel after passing straight through an intersection. The second condition predefined to determine that the own vehicle M1 will make a turn at the intersection without confirming to the occupant of the own vehicle includes: any one of the conditions (a3) through (a6)+a condition (b3) that there is neither a traffic jam nor a traffic regulation along a route that the own vehicle M1 will travel after making a turn at the intersection.

The vehicle control apparatus 10 of the second embodiment can similar advantages to those of the vehicle control apparatus 10 of the first embodiment. The vehicle control apparatus 10 of the second embodiment can provide the following additional advantage. In cases where there is a traffic jam, a traffic regulation or the like along a route that the own vehicle M1 will travel after making a turn at an intersection or after passing straight through an intersection, the vehicle control apparatus 10 confirms to the occupant of the own vehicle M1 as to whether or not the own vehicle M1 will make a left or right turn at the intersection. This enables properly determining a situation that the own vehicle M1 may make a turn at the intersection after changing a driving plan.

C. Third Embodiment

Figure 8:
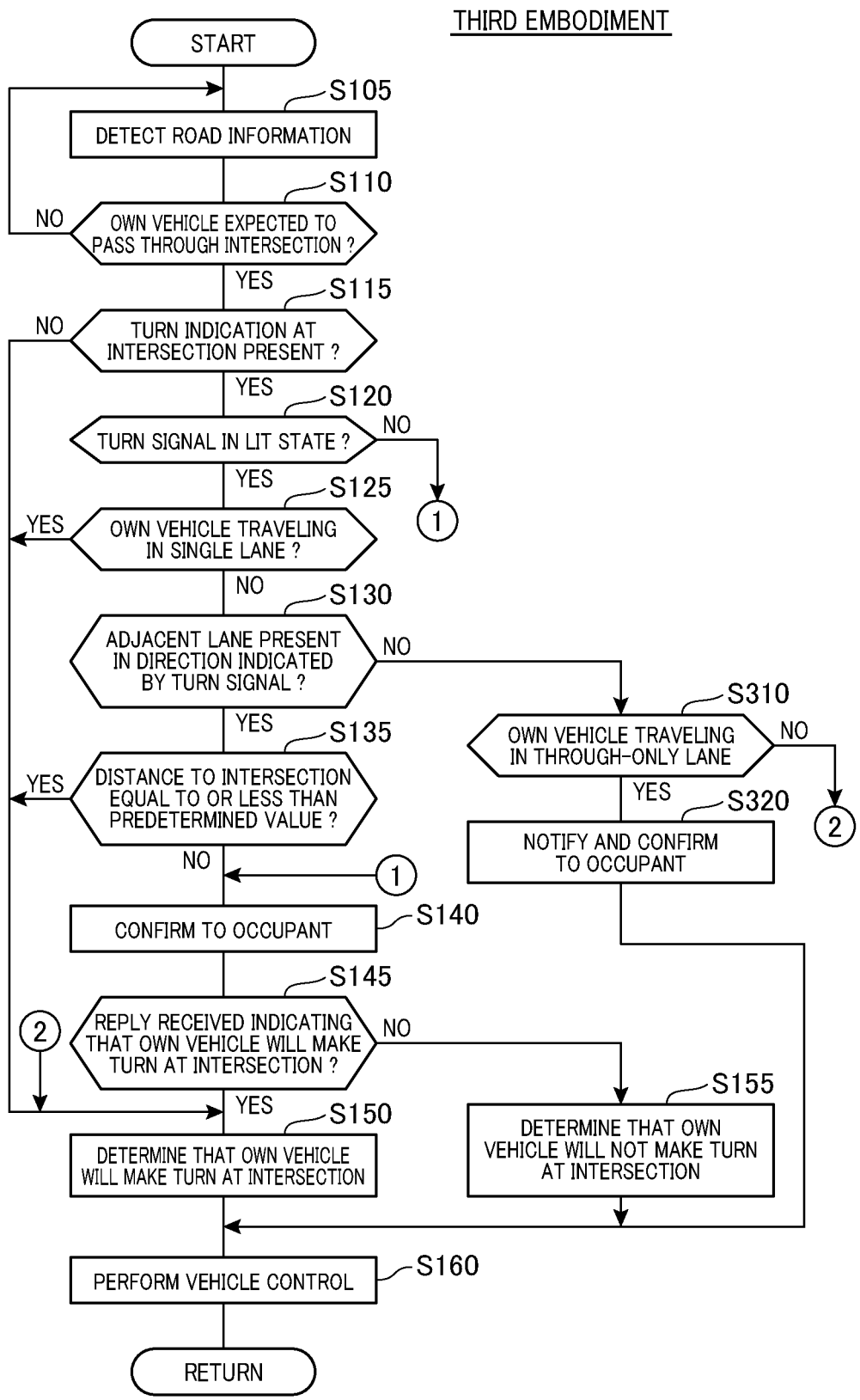
FIG. 8 is a flowchart of vehicle control processing according to a third embodiment.

In the vehicle control processing of a third embodiment shown in FIG. 8, if the turn signal 250 is operated despite making a turn at an intersection being prohibited, the vehicle control apparatus 10 further provides a notification to the occupant of the own vehicle. The vehicle control processing of the third embodiment is different from the vehicle control processing of the first embodiment in that steps S310 and S320 along the "NO" branch of step S130 are included. The other elements of the second embodiment having the same functions as in the first embodiment are numbered the same, and duplicate description will be omitted.

As shown in FIG. 8, if the road information detection unit 20 determines that there is no lane adjacent to the lane in which the own vehicle M1 is traveling, in the direction indicated by the turn signal 250 in the lit state (the "NO" branch of step S130), then at step S310 the road information detection unit 20 determines whether or not the own vehicle M1 is traveling in a through-only lane. If the road information detection unit 20 determines that the own vehicle M1 is not traveling in a through-only lane (the "NO" branch of step S310), the process flow proceeds to step S150. If the road information detection unit 20 determines that the own vehicle M1 is traveling in a through-only lane (the "YES" branch of step S310), then at step S320 the confirmation unit 50 notifies and confirms to the occupant.

Figure 9:
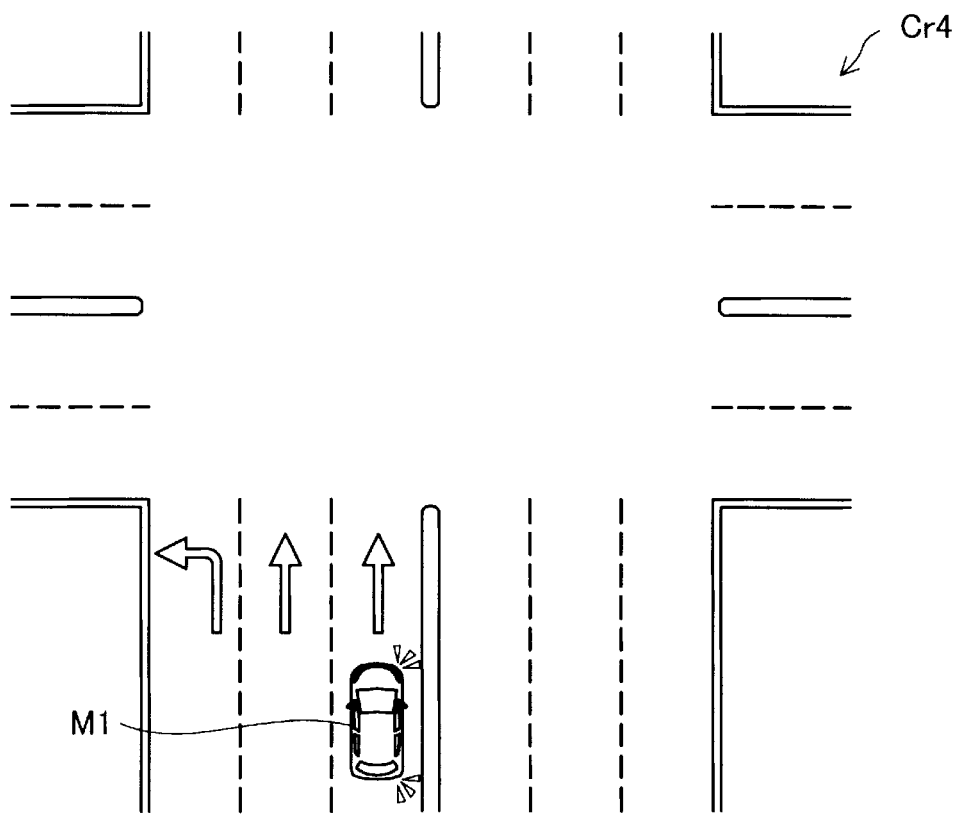
FIG. 9 is an example situation corresponding to the "YES" branch of step S130.

In the example shown in FIG. 9, the own vehicle M1 travelling in a through-only lane is expected to make a turn at an intersection Cr4 and the right turn signal 250 is in the lit state. In addition, there is no lane right adjacent to the lane of travel of the own vehicle M1. In such a situation, two cases can be assumed. In one case, the own vehicle M1 is going to make a right turn at the intersection Cr4 despite the intersection Cr4 being a no-right-turn intersection. In the other case, the turn signal 250 was incorrectly operated.

Then, at step S320, the confirmation unit 50 controls the interface ECU 140 to generate a sound output, such as "Are you going to make a right turn at the intersection? This intersection is a no-right-turn intersection. Therefore, this vehicle will keep running straight.", from a speaker of the HMI 240 to notify and confirm to the occupant of the own vehicle M1. At step S160, the operation control apparatus 100 performs, as vehicle control, control of the own vehicle M1 to cause the own vehicle M1 to pass straight through the intersection Cr4. Instead of such control to cause the own vehicle M1 to pass straight through the intersection Cr4, control may be performed to switch to manual driving, or control may be performed to stop the own vehicle M1 before the intersection Cr4.

In the present embodiment, the first condition predefined to determine that the own vehicle M1 may make a turn at the intersection includes a condition (c1) that the own vehicle M1 is traveling in a through-only lane. The second condition predefined to determine that the own vehicle M1 will make a turn at the intersection without confirming to the occupant of the own vehicle includes a condition (c2) that the own vehicle M1 is not traveling in a through-only lane.

The vehicle control apparatus 10 of the third embodiment can similar advantages to those of the vehicle control apparatus 10 of the first embodiment. The vehicle control apparatus 10 of the third embodiment can provide the following additional advantage. In cases where the own vehicle M1 is prohibited from making a turn at the intersection (due to, e.g., the own vehicle being traveling in a through-only lane), the vehicle control apparatus 10 notifies and confirms to the occupant of the own vehicle M1 that making a turn at the intersection is prohibited, which allows the occupant of the own vehicle to know that turn assistance control will not be performed.

D. Fourth Embodiment

Figure 10:
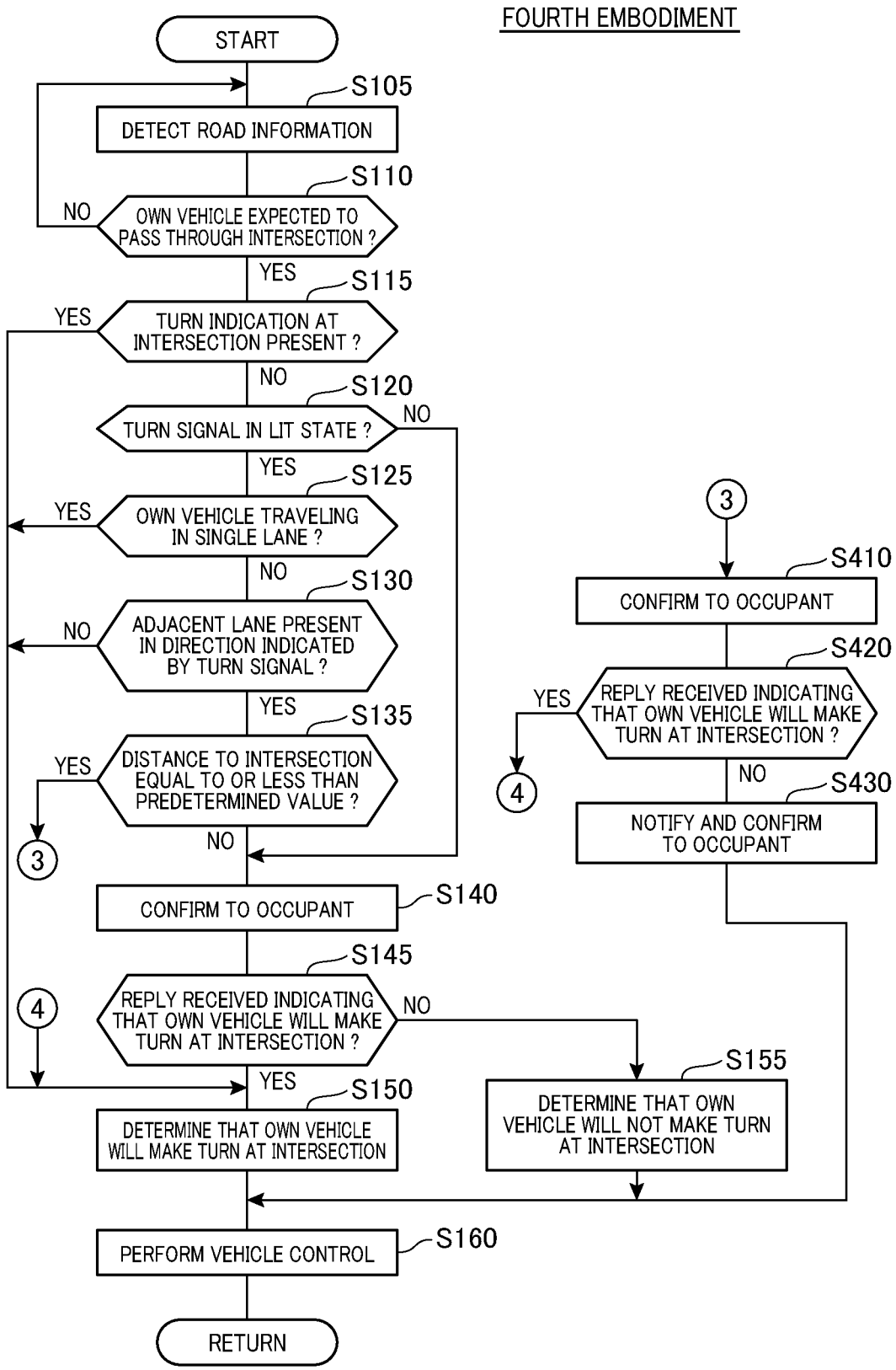
FIG. 10 is a flowchart of vehicle control processing according to a fourth embodiment.

In the vehicle control processing of a fourth embodiment shown in FIG. 10, if the turn signal 250 is operated despite making a lane change being prohibited, the vehicle control apparatus 10 further confirms to the occupant of the own vehicle. The vehicle control processing of the fourth embodiment is different from the vehicle control processing of the first embodiment in that steps S410 through S430 along the "YES" branch of step S135 are included. The other elements of the second embodiment having the same functions as in the first embodiment are numbered the same, and duplicate description will be omitted.

As shown in FIG. 10, if the road information detection unit 20 determines that the distance from the own vehicle M1 to the intersection is equal to or less than the predetermined value (the "YES" branch of step S135), then at step S410 the confirmation unit 50 confirms to the occupant as to whether or not the own vehicle M1 will make a turn at the intersection.

Figure 11:
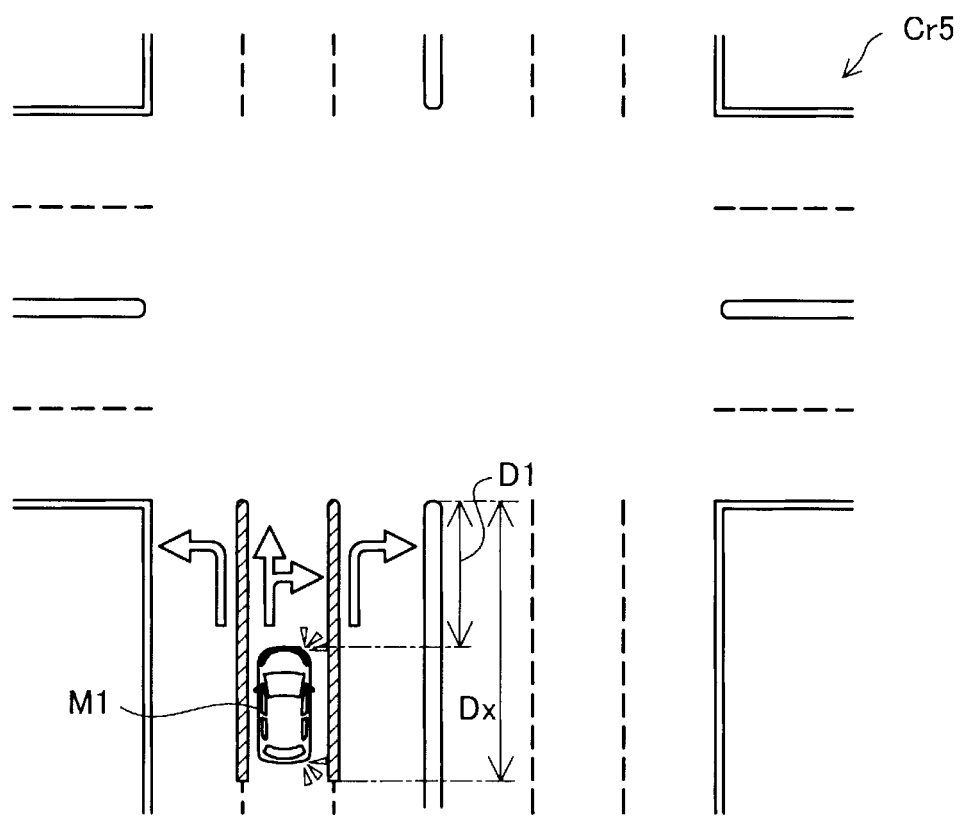
FIG. 11 is an example situation corresponding to the "YES" branch of step S135.

In the example shown in FIG. 11, the own vehicle M1 traveling in a through and right-turn only lane is expected to pass through an intersection Cr5 and the right turn signal 250 is in the lit state. In addition, there is a lane right adjacent to the lane of travel of the own vehicle M1. In such a situation, two cases can be assumed. In one case, the own vehicle M1 is going to make a right turn at the intersection Cr5. In the other case, the own vehicle M1 is going to make a lane change to a right adjacent lane (the rightmost lane in this example) despite making a lane change being prohibited. Therefore, at step S410, the confirmation unit 50 confirms to the occupant as to whether or not the own vehicle M1 will make a turn at the intersection Cr5.

As shown in FIG. 10, at step S420, the determination unit 60 determines whether or not a reply indicating that the own vehicle M1 will make a turn at the intersection Cr5 has been received from the occupant in response to confirmation by the confirmation unit 50. If the determination unit 60 determines that the reply indicating that the own vehicle M1 will make a turn at the intersection Cr5 has been received from the occupant (the "YES" branch of step S420), then at step S150 the determination unit 60 determines that the own vehicle M1 will make a turn at the intersection Cr5 without making a lane change.

If the determination unit 60 determines that no reply indicating that the own vehicle M1 will make a turn at the intersection Cr5 has been received from the occupant (the "NO" branch of step S420), then at step S430 the confirmation unit 50 controls the interface ECU 140 to generate a sound output, such as "Are you going to make a lane change? Making a lane change is prohibited. Therefore, this vehicle makes a right turn at the intersection Cr5 without making a lane change.", to notify and confirm to the occupant of the own vehicle M1. At step S160, the operation control apparatus 100 performs, as vehicle control, control of the own vehicle M1 to keep running in the current lane and make a right turn at the intersection Cr5. Instead of such control to cause the own vehicle to make a right turn at the intersection Cr5, control may be performed to cause the own vehicle to pass straight through the intersection Cr5, control may be performed to switch to manual driving, or control may be performed to stop the own vehicle M1 before the intersection Cr5.

In the present embodiment, the first condition predefined to determine that the own vehicle M1 may make a turn at the intersection includes a condition (d1) that the distance from the own vehicle M1 to the intersection Cr5 is equal to or less than the predetermined value.

The vehicle control apparatus 10 of the fourth embodiment can provide similar advantages to those of the vehicle control apparatus 10 of the first embodiment. The vehicle control apparatus 10 of the fourth embodiment can provide the following additional advantage. In cases where the turn signal 250 is operated despite making a lane change being prohibited (due to, e.g., the own vehicle being traveling in a through and right-turn only lane), the vehicle control apparatus 10 confirms to the occupant of the own vehicle M1 as to whether or not the own vehicle M1 will make a turn at the intersection Cr5, and in response to a replay from the occupant, notifies the occupant that a lane change is prohibited, which allows the occupant of the own vehicle to know that lane-change assistance control will not be performed.

E. Modifications (1) Several specific embodiments of the present disclosure have so far been described. However, the present disclosure should not be construed as being limited to the foregoing embodiments, but may be modified in various modes. For example, in one alternative embodiment, the turn-only switch 260 may be removed from the vehicle control apparatus 10 set forth above, where operating the turn signal 250 with an amount of force greater than a predetermined value may mean a turn indication. In one alternative embodiment, both the turn signal 250 and the turn-only switch 260 may be removed, where, the occupant of the own vehicle may provide an indication for making a lane change or a turn by speaking to a microphone. Such configurations can provide similar advantages to those of the specific embodiments set forth above.

(2) Specific procedures of the vehicle control processing have so far been described, but may be modified in various modes. In one alternative embodiment, if it is to be determined based on destination information set by the occupant of the own vehicle that the own vehicle will make a turn at an intersection, then at step S115 it may be determined that there is a turn indication at the intersection from the own vehicle M1. In one alternative embodiment, it is determined that the turn signal 250 is not in the lit state (the "NO" branch of step S120), the process flow may proceed to step S155 instead of proceeding to step S140. That is, in such an embodiment, without confirming to the occupant of the own vehicle, it may be determined that the own vehicle M1 will not make a turn at the intersection. In such an embodiment, a settings change related to confirmation to the occupant may be made by the occupant of the own vehicle operating a settings screen or the like, which can inhibit the occupant of the own vehicle from feeling discomfort that might be caused by the confirmation to the occupant being made at each intersection. In an alternative embodiment, instead of the process flow proceeding to step S150 without confirming to the occupant of the own vehicle, a confirmation may be made to the occupant of the own vehicle also in situations where the own vehicle is likely to make a left or right turn at an intersection. This enabling properly determining that the turn signal 250 or the turn-only switch 260 was incorrectly operated or that a right-about-turn will be made, and thus inhibiting determination accuracy lowering as to the own vehicle will make a turn at an intersection. Also in such an embodiment, a determination as to whether to make a confirmation to the occupant of the own vehicle may be preset by the occupant operating the settings screen or the like. As above, if there is no reply indicating that the own vehicle will make a turn at an intersection in situations where the own vehicle is likely to make a turn at the intersection, it is determined that the own vehicle M1 will not make a turn at the intersection. In such a case, the operation control apparatus 100 may, instead of performing turn assistance control, perform control to switch to manual driving or control to stop the own vehicle M1 prior to the intersection. In one alternative embodiment, for example, at step S135, it may be determined whether or not the distance from the own vehicle M1 to the intersection is equal to or less than a predetermined value and the color of lane lines that demarcate each lane is a color prohibiting lane changes. In one alternative embodiment, for example, at least one of step S115, step S125, step S130, and step S135 may be removed. In an embodiment where step S125 and step S130 are removed, the road information detection unit 20 may skip detecting, as the road information, lane-of-travel information about a lane of travel of the own vehicle M1. In an embodiment where step S135 is removed, the road information detection unit 20 may skip detecting, as the road information, information about a distance between the intersection and the own vehicle M1. In one alternative embodiment, in any other situations where the turn signal 250 or the turn-only switch 260 was incorrectly operated can be assumed or the occupant of the own vehicle has forgotten to operate the turn signal 250 or the turn-only switch 260 can be assumed, a confirmation may be made to the occupant of the own vehicle. In one alternative embodiment where there is a store or the like located prior to an intersection, a further confirmation may be made to the occupant of the own vehicle as to whether the own vehicle will make a left or right turn or enter the store. In such an embodiment, in the presence of a central reservation between the lane of travel and the oncoming lane, it may be determined that the own vehicle will make a turn at the intersection without confirming to the occupant of the own vehicle.

That is, typically, if the operating state and the road information of the turn signal 250 satisfy the predefined first condition to determine that the own vehicle M1 may make a left or right turn at an intersection, the confirmation unit 50 may confirm to the occupant of the own vehicle. If the operating state and the road information of the turn signal 250 satisfy the predefined second condition to determine that the own vehicle M1 is likely to make a turn at an intersection, the confirmation unit 50 may withhold confirming to the occupant of the own vehicle. Alternatively, the confirmation unit 50 may confirm to the occupant of the own vehicle M1 even if the own vehicle M1 is less likely to make a left or right turn at the intersection. As another alternative, the confirmation unit 50 may confirm to the occupant of the own vehicle M1 even if the second condition is met. Such configurations can provide similar advantages to those of the specific embodiments set forth above.

(3) An example configuration of the confirmation unit 50 has so far been described in each above embodiment, but may be modified in various modes. Instead of using the sound output "Are you going to make a right turn at the intersection?", whether or not the own vehicle M1 will make a turn at the intersection may be confirmed by using a sound output "Are you going to make a lane change?". In addition, instead of using the sound output from the speaker of the HMI 240, whether or not the own vehicle M1 will make a turn at the intersection may be confirmed by not only outputting a warning sound from the speaker, but also by displaying a confirmation result on the display unit. In the above embodiments, the occupant of the own vehicle replies by selecting and pushing down one of the YES and NO buttons located on the steering wheel. In one alternative embodiment, the occupant of the own vehicle may reply by selecting and touching one of YES and NO buttons displayed on a touch panel of the display unit. In another alternative embodiment, the occupant of the own vehicle may reply orally by speaking to a microphone. Such configurations can provide similar advantages to those of the specific embodiments set forth above.

(4) The vehicle control apparatus 10 described in each above embodiment is mounted in the own vehicle M1 powered by an engine, which supports automatic driving. In one alternative embodiment, the vehicle control apparatus 10 configured as above may be mounted in a fuel cell vehicle, a hybrid vehicle, an electric vehicle or the like.

(5) In each embodiment, a part of the configuration realized by hardware may be replaced with software. On the contrary, a part of the configuration realized by software may be replaced with hardware. For example, at least one functional unit of road information detection unit 20, the turn-signal state detection unit 30, the turn indication detection unit 40, the confirmation unit 50, and the determination unit 60 may be realized by an integrated circuit, a discrete circuit, or a module formed by combining the integrated circuit and the discrete circuit. When a part or all of the functions of the present disclosure are realized by software, the software (computer program) may be provided in a form stored in a computer-readable recording medium. The computer-readable recording medium is not limited to a portable storage medium such as a flexible disk and a CD-ROM, but may include an internal storage device in a computer, such as various RAMs and ROMs and an external storage device connected to a computer, such as a hard disk. That is, the computer-readable recording medium has a broad meaning, including an arbitrary recording medium that is non-temporary storage of data packets.

The present disclosure is not limited to each embodiment described above, but may be realized by various configurations within a scope not departing from the spirit of the disclosure. For example, the technical features in each embodiment, corresponding to the technical features of the aspects described in the specification may be replaced or combined as appropriate to solve a part or all of the above-described problems or to achieve a part or all of the above-described advantageous effects. Unless the technical features are described as being an essential feature in the present specification, the technical features may be omitted as appropriate.

What is claimed is:

1. An apparatus for assisting a turn of a vehicle at an intersection, comprising:
    a processor;
    a non-transitory computer-readable storage medium; and
    a set of computer-executable instructions stored on the non-transitory computer-readable storage medium that cause the processor to:
    detect road information that is information regarding a road on which the vehicle is traveling;
    detect an operating state of a turn-only switch, the turn-only switch configured to be operated by an occupant of the vehicle to indicate only a left or right turn of the vehicle;
    detect an operating state of a turn signal of the vehicle, the turn signal configured to be operated by the occupant of the vehicle to indicate at least one of a lane change and a left or right turn of the vehicle;
    for a state in which a detected operating state of the turn-only switch is off at an intersection and both a detected operating state of the turn signal and a detected road information satisfy a first condition, which is predefined to determine whether the vehicle may make a turn at the intersection but insufficient to determine that the vehicle will make a turn at the intersection, confirm to the occupant of the vehicle as to whether or not the vehicle will make a turn at the intersection by communicating a request to the occupant, in which the occupant is requested to confirm via a reply whether the occupant will perform a turn at the intersection; and
    determine whether or not the vehicle will make a turn at the intersection using at least one of the detected operating state of the turn signal, the detected road information, and a result of confirmation from the confirmation unit.

2. The apparatus according to claim 1, wherein
    the road information includes lane-of-travel information that is information about a lane in which the vehicle is traveling.

3. A method for assisting a turn of a vehicle at an intersection, comprising:
    detecting road information that is information regarding a road on which the vehicle is traveling;
    detecting an operating state of a turn-only switch, the turn-only switch configured to be operated by the occupant of the vehicle to indicated only a left or right turn of the vehicle;

detecting an operating state of a turn signal of the vehicle, the turn signal configured to be operated by an occupant of the vehicle to indicate at least one of a lane change and a left or right turn of the vehicle;

for a state in which a detected operating state of the turn-only switch is off at an intersection and both a detected operating state of the turn signal and a detected road information satisfy a first condition, which is predefined to determine whether the vehicle may make a turn at the intersection but insufficient to determine that the vehicle will make a turn at the intersection, confirming to the occupant of the vehicle as to whether or not the vehicle will make a turn at the intersection by communicating a request to the occupant, in which the occupant is requested to confirm via a reply whether the occupant will perform a turn at the intersection, in response to the detected operating state of the turn signal and the detected road information; and determining whether or not the vehicle will make a turn at the intersection, using at least one of the detected operating state of the turn signal, the detected road information, and a result of confirmation to the occupant of the vehicle.

4. The apparatus according to claim 1, wherein the road information includes lane-of-travel information that is information about a lane in which the vehicle is traveling, and the first condition includes a condition that the detected operating state of the turn signal is a lit state and there is a lane adjacent to the lane in which the vehicle is traveling, in a direction indicated by the turn signal in the lit state.

5. The apparatus according to claim 1, wherein the set of computer-executable instructions further cause the processor to, for a state in which the detected operating state of the turn signal and the detected road information satisfy a second condition predefined to determine that the vehicle will make a turn at the intersection, withhold confirming to the occupant of the vehicle as to whether or not the vehicle will make a turn at the intersection.

6. The apparatus according to claim 5, wherein the road information includes information about a distance from the vehicle to the intersection, and the second condition includes a condition that distance from the vehicle to the intersection is equal to or less than a predetermined value.

\* \* \* \* \*